Nov. 14, 1950      A. W. GOLASKY      2,529,870

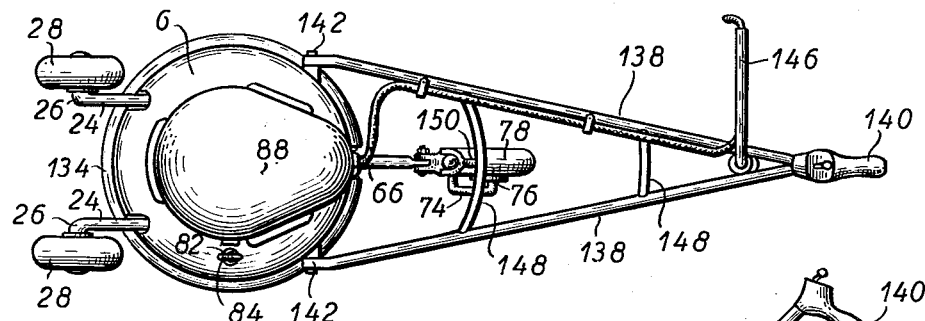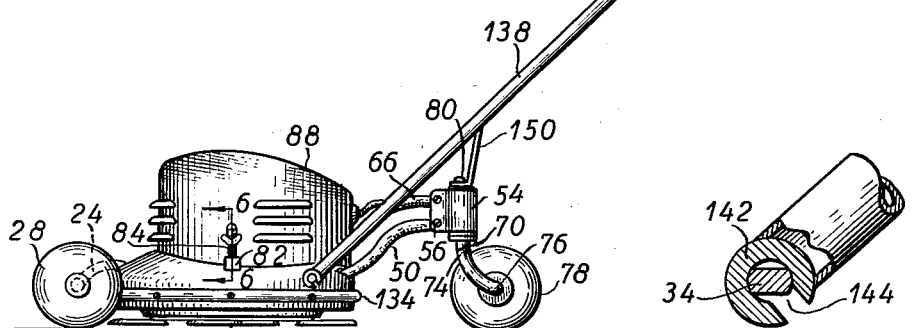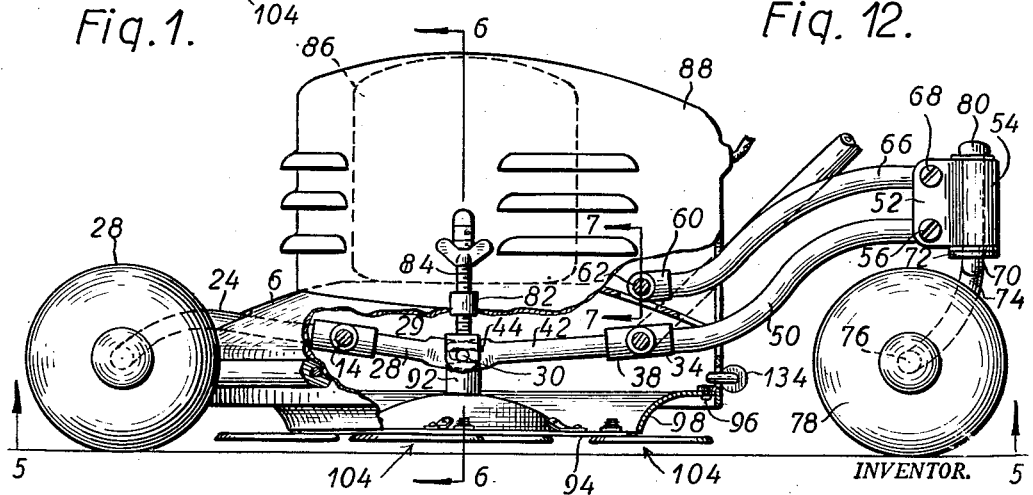

ROTATING DISK POWER LAWN MOWER

Filed May 13, 1947      3 Sheets-Sheet 2

INVENTOR.
ADOLPH W. GOLASKY
BY
Busser + Harding
ATTORNEYS

Nov. 14, 1950 — A. W. GOLASKY — 2,529,870
ROTATING DISK POWER LAWN MOWER
Filed May 13, 1947 — 3 Sheets-Sheet 3

INVENTOR.
ADOLPH W. GOLASKY
BY
Busser & Harding
ATTORNEYS

Patented Nov. 14, 1950

2,529,870

UNITED STATES PATENT OFFICE 2,529,870

ROTATING DISK POWER LAWN MOWER

Adolph W. Golasky, National Park, N. J.

Application May 13, 1947, Serial No. 747,612

6 Claims. (Cl. 56—25.4)

This invention relates to an improvement in lawn mowers having cutter blades rotated about a vertical axis so as to produce sweeping cuts in a horizontal plane such as produced by a scythe or sickle.

One of the objects of my invention is the provision of relatively short cutter blades pivotally mounted adjacent the edge of a spinner ring or blade support secured to a driving shaft.

Another object of my invention is the provision of means for pivotally supporting the blades from the spinner ring in such a manner that the blades are each held in cutting position by means of a spring connected thereto and to the spinner ring so that the blades may be moved within the periphery of the spinner ring if an object is engaged by a blade too heavy to be cut thereby so that if the mower should be advanced a short distance beyond the point where the blades first engage the object, the blades will be shifted within the periphery of the spinner ring and the periphery of the spinner ring will engage the object and rotate in contact therewith so that the object would not be struck a blow by a member to which the cutter blade is secured.

Another object of my invention is the provision of means whereby the blades can be sharpened on a flat surface such as a concrete walk or a flat flagstone walk by rotating the spinner ring by the driving motor with the cutter blades in contact with such surface.

Another object of my invention is the provision of adjusting means between the frame and the supporting wheels, whereby the axis of the driving shaft for the spinner ring will be adjusted perpendicular to the surface engaged by the supporting wheels to vary the depth of the cut and to lower the blades into a position to be sharpened.

A still further object of my invention is the provision of positioning and spring retaining means for mounting the blades on the spinner ring while retaining them in the plane of the spinner ring and at the same time retain them at an angle to a radial line passing through the axis of the spinner ring to give the blades a sliding movement during rotation about the axis of the spinner ring.

Another object of my invention is the provision of a blade having a cutting edge around the entire periphery thereof, and which can be ground on a plane surface whereby the entire surrounding cutting edge may be ground on a flat face grinding surface.

Another object of my invention is the provision of an annular cover ring extending upwardly and outwardly from a position adjacent to the periphery of the spinner ring to an annular flange of the frame to which it is connected, which cover ring forms a perfect guard for preventing cuttings being wrapped about the driving shaft.

Another object of my invention is the provision of connecting means between the operating handle and mower which is pivotally connected to the mower in such a manner that the handle can be disconnected by shifting it into a vertical position so that the handle can be stood beside the mower to reduce the over all length thereof when not in use.

A still further object of my invention is the provision of means for connecting the cord leading from a source of current to the driving motor to the end of the operating handle whereby the cord will be clear of the operator.

Having now described in a general way the nature and purpose of this invention, I will proceed, for illustrative purposes, to a detailed description of a preferred embodiment thereof, with reference to the accompanying drawings, in which:

Fig. 1 is a side elevation of a lawn mower in accordance with my invention;

Fig. 2 is a plan view thereof;

Fig. 3 is a side elevation of the mower with portions in section, and with the caster wheel in its reversed position;

Fig. 12 is a detail sectional view on a larger scale showing the connection between the end thereof and the mower.

Figure 4:
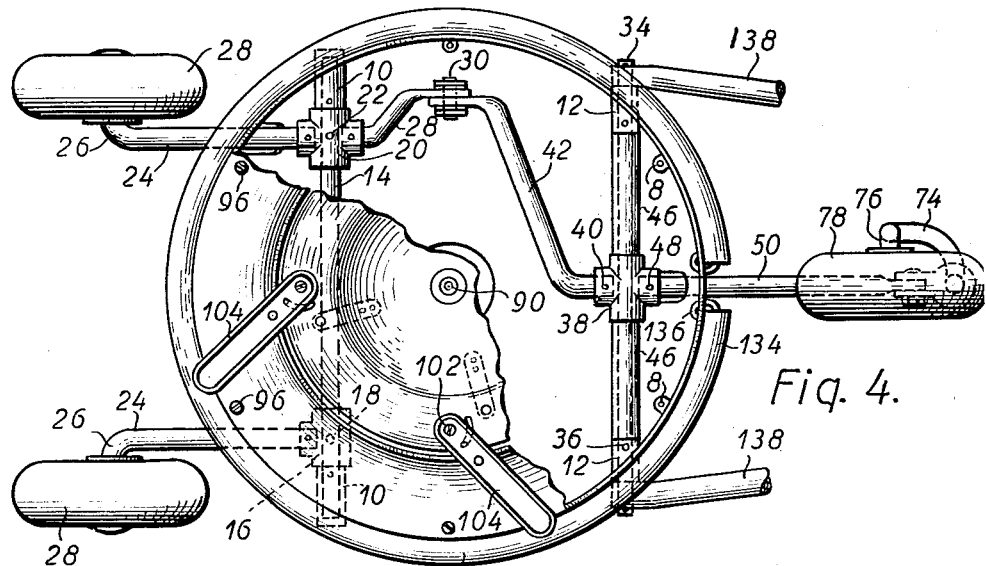
Fig. 4 is an inverted plan view of Fig. 3 with portions in section.
Figure 6:
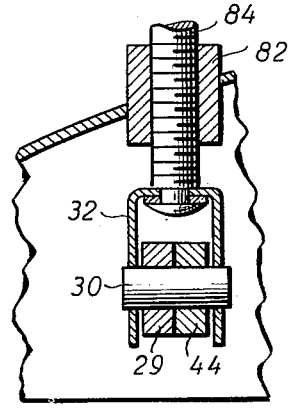
Fig. 6 is a detail sectional view through the adjusting means on the line 6—6 of Fig. 1.
Figure 5:
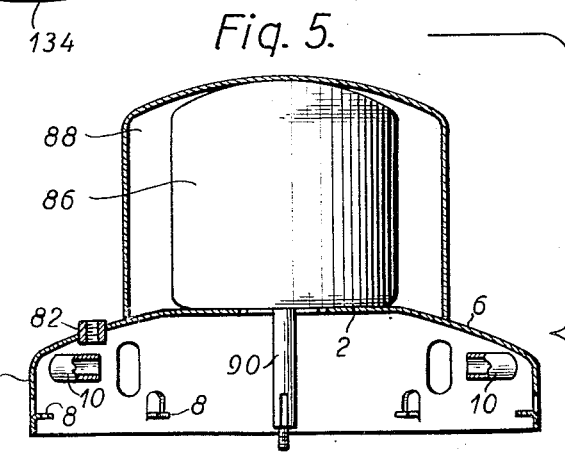
Fig. 5 is a transverse sectional view with various portions separated from each other.
Figure 7:
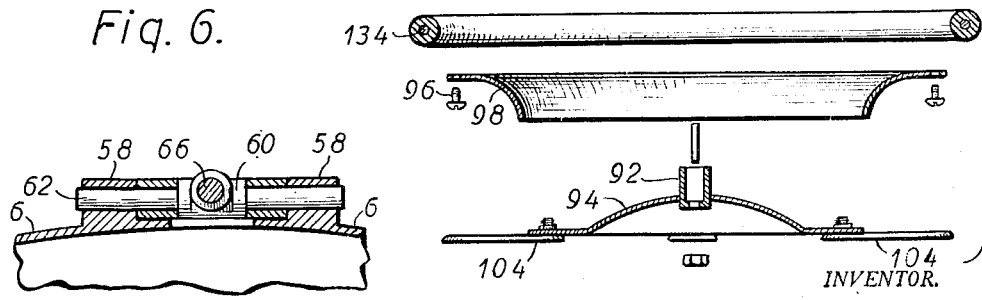
Fig. 7 is a detail sectional view on the line 7—7 of Fig. 3.

The machine comprises an inverted shallow cup-shaped frame preferably formed of sheet metal having a flat top portion 2, an annular flange 4 connected to the top portion 2 by a sloping portion 6, and extending inwardly from the flange 4 above the lower edge thereof are six projections 8 for the purpose hereinafter described.

Extending through opposite sides of the flange 4 of the frame at the front of the machine are two short tubular members 10, 10 whose axes are in alignment with each other, and extending through the sides of the flange 4 at the rear portion of the frame are two similar tubular members 12, 12 whose axes are in alignment with each other as well as parallel to the axes of the tubular members 10, 10.

These tubular members 10, 10 and 12, 12 are welded to the flange 4 and form bearings for rocking means for the adjusting means for raising and lowering the frame of the machine relative to the surface engaged by the supporting wheels.

Rockably journaled in the tubular members 10, 10 is a shaft 14 shown mostly in dotted lines in Fig. 4.

Mounted on one end of shaft 14 and in engagement with the inner face of the tubular member is a T pipe coupling 16 connected to the shaft by means of a tapered pin 18, and connected to the other end of the shaft 14 in engagement with the inner end of the other tubular member 10 is a four-way or cross pipe coupling 20 by means of a tapered pin 22.

Extending forwardly through slots in the annular frame from each of the couplings 16 and 20 and connected thereto by tapered pins is a rod 24, each being provided with an outwardly extending trunnion 26 on which a supporting wheel 28 is mounted, preferably on ball bearings of conventional type, and within the swath cut by the blades.

Extending rearwardly from the coupling 20 and secured thereto by a tapered pin is an arm 28, the end 29 of which is forked and embraces a pin 30 extending through the arms of a U-shaped clip 32 for the purpose hereinafter described.

Extending through tubular members 12, 12 is a rod 34 connected to the lower tubular member 12 shown in Fig. 4 by a tapered pin 36, and mounted for oscillation on the rod 34 intermediate the tubular members 12, 12 is a four-way or cross pipe coupling 38. Connected to the coupling 38 by a tapered pin 40 is a forwardly extending rod 42 having a forked end 44 which also engages the pin 30 extending through the arms of the U-shaped clip 32. A spaced tube designated 46 is located on the rod 34 between the cross coupling 38 and each of the tubular members 12 for retaining the coupling in a central position on the rod 34.

Extending rearwardly through a slot in the annular frame from the coupling 38 and pinned thereto by a tapered pin 48 is a rod 50, the other end of the rod being pivotally connected between the lower portions of flanges 52 extending from a caster head 54 by means of a pivot pin 56.

Welded to the top of sloping portion 6 of the cup-shaped frame of the mower are two bearing members 58 equally spaced from the longitudinal center of the machine.

The axes of the bearing members 58 are parallel with the axes of the tubular members 10, 10 and 12, 12 and are also located in a plane extending perpendicular to the tubular members 12, 12. Extending through the bearing members 58 and a T coupling 60 between the bearing members 58 is a shaft 62 which is connected to the coupling 60 by a tapered pin. Connected to the rearwardly extending tube of coupling 60 by means of a tapered pin is one end of a rearwardly extending rod 66, the other end thereof being mounted between the upper portions of the flanges 52 extending from the caster head 54 and is journaled on a pin 68, the rods 50 and 66 forming parallel bars for moving the caster head 54 parallel with the axis of a vertical motor shaft as hereinafter described.

Mounted in a through bore in the caster head, the axis of which is perpendicular with a plane through the axes of pivot pins 56 and 68 of rods 50 and 66, is a spindle 70 extending upwardly from a head 72, and extending downwardly, laterally and then downwardly from the head 72 is a bar 74, having a laterally extending spindle 76 on which is mounted a caster wheel 78. Both the head 72 and the wheel 78 may be provided with ball bearings if desired.

Threaded on the upper end of the spindle 70 and in contact with the upper face of the caster head 54 is a cap nut 80 for retaining the spindle in the socket in the caster head 54.

Extending through an opening through the sloping portion 6 of the cup-shaped frame and welded thereto is a threaded tubular member 82, the axis of which is parallel to the axis of the motor shaft hereinafter described, and threaded in said member 82 is a thumb screw 84, the lower end of which is reduced in diameter and extends through an opening in the cross bar of the U-shaped clip 32 and a washer, the lower end thereof being riveted whereby the clip 32 may be raised and lowered by rotating the thumb screw 84 as hereinafter described.

Mounted on the flat top portion 2 of the cup-shaped frame of the machine is an electric motor 86 shown in dotted lines within the motor casing 88 resting on the top of the cup-shaped frame. The motor is provided with a vertical shaft 90 to which an upwardly extending hub 92 of a spinner ring or blade support 94 is secured whereby the spinner ring is rotated.

The six projections 8 heretofore mentioned extending inwardly from the flange 4 of the cup-shaped frame are formed by dieing out portions of the metal of the flange and bending them inwardly, and secured to these projections by means of screws 96 is a flared cover ring 98 shaped similar to the bell of a horn, which extends inwardly from the interior of the flange 4 of the frame and downwardly into proximity to the periphery of the spinner ring 94 and forms a guard for preventing cut grass from entering the space within the frame above the spinner ring.

The spinner ring is provided with an annular horizontal flange 100 and an upwardly dished portion extending from the flange to an intermediate portion of its hub 92.

The flange 100 is provided with four bosses or fixed nuts 101 spaced 90° from each other, each being threaded for the reception of a screw 102 forming a bearing on each of which a blade 104 is pivotally mounted.

Figure 10:
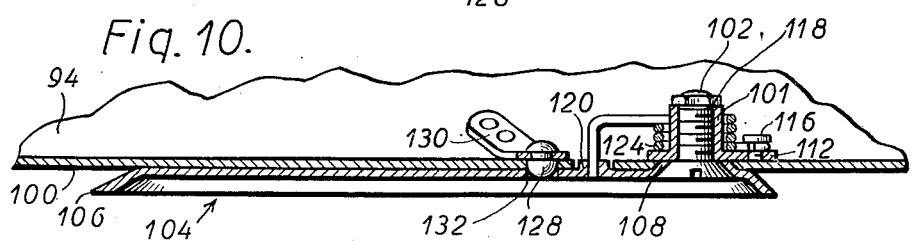
Fig. 10 is a detail sectional view on the line 10—10 of Fig. 9.
Figure 11:
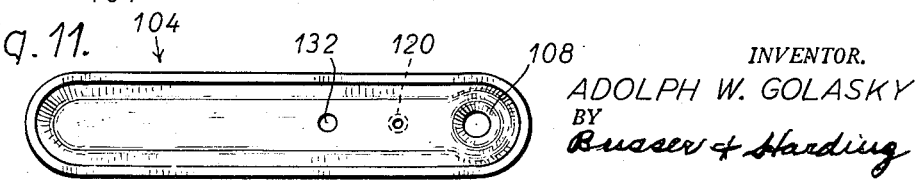
Fig. 11 is an inverted plan view of a cutter blade.

The cutter blades are each dished to form flaring flanges as shown in Figs. 10 and 11 to provide a cutting edge 106 around its entire periphery, one end thereof is provided with a tapered protuberance 108, the inner face thereof bearing on the head of the screw while the outer face is seated in a tapered socket formed in the flange 100 of the spinner ring 94. Each of the screws 102 is provided with a fixed nut 101 having a flange 112 secured to the flange 100 by means of screws 114 and 116, and 118 is a lock-nut for locking the screw in its adjusted position in the fixed nut 101.

The protuberance 108 is seated in the recess between the tapered head of the screw 102, the inner face of the nut 101 and the tapered bore in the flange 100, the screw is then locked in its adjusted position by the lock-nut 118.

Figure 8:
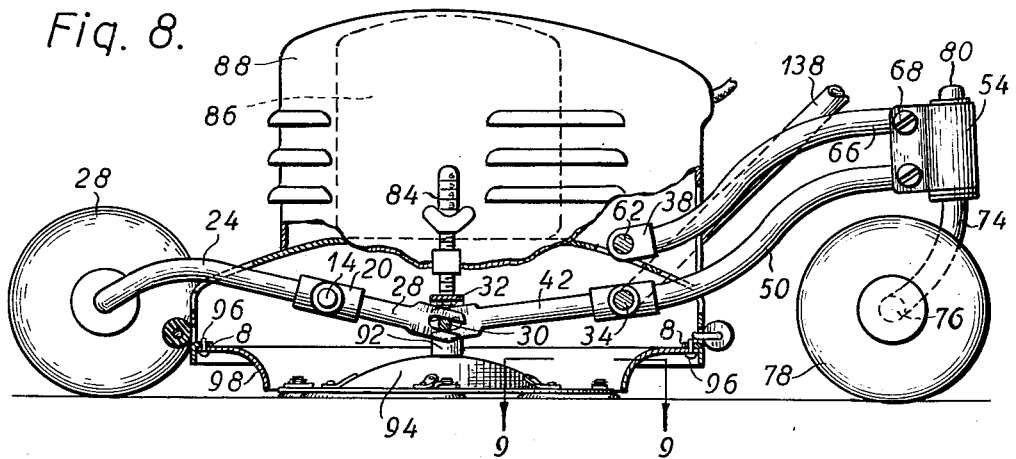
Fig. 8 is a view similar to Fig. 3 showing the cutter blades in sharpening position.
Figure 9:
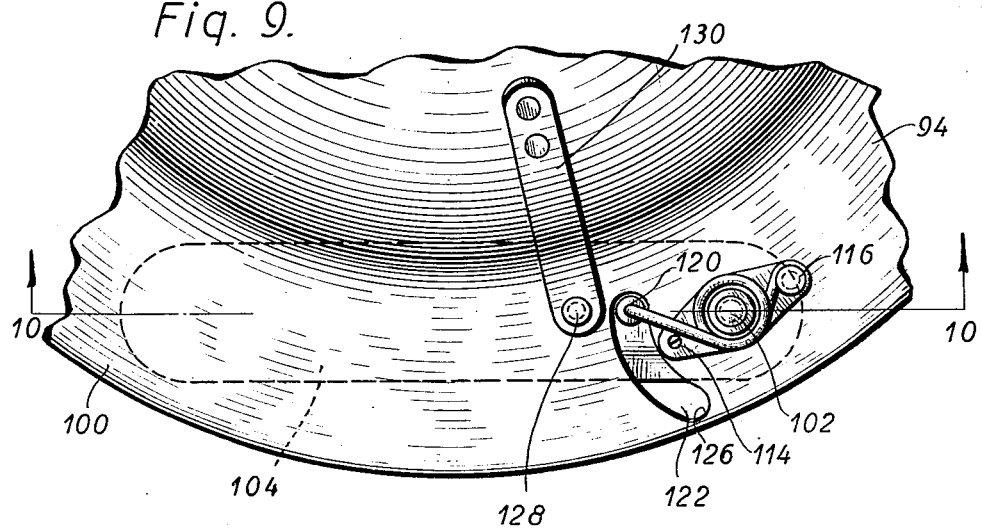
Fig. 9 is a plan view of a portion of the spinner ring, showing one of the blades in dotted lines when in position for grinding.

In order to maintain the cutter blades in cutting positions each blade is provided with a second protuberance 120 which is movable in an arcuate slot 122 in the flange 100 struck from the axis of the screw 102 and is retained in cutting position by a coil spring 124 surrounding the nut 101, one end of the spring being hooked about a neck formed on the screw 116, the other end extending into an opening in the protuberance 120 and normally retains the cutter blade at a tangent to the axis of spinner ring except when the blade is shifted to the position for grinding as shown in Figs. 8, 9 and 10, or when an object is engaged by the blade which is too heavy to be cut by the blade, in which case, the blade will be rotated about the screw and pass the object engaged by the blade and after the blade has passed the obstruction, the spring 124 will return the blade to its normal cutting position and bring the protuberance 120 against the edge 126 of the slot 122.

In order to retain the blades in position for grinding and to properly back them up to apply an equal pressure to all portions of the blades, the blades are shifted under the spinner ring 94 as shown in Figs. 9 and 10, the blades being held in their grinding positions by a detent 128 seated in an opening in the flange 100 of the spinner ring by a leaf spring 130 to one end of which it is attached, the other end of the spring being connected to the upwardly curved portion of the spinner ring, the spring forcing the detent into an opening 132 in the blade.

Mounted on the exterior of the cup-shaped frame and surrounding the annular flange 4 slightly above the lower edge thereof, is a bumper 134 formed of rubber about a wire core, the ends of which are passed through openings in the flange 4 and bent as shown at 136 in Fig. 4, the portions of the bumper between the ends may be held in place by screws threaded in the flange 4 or in any desired manner, and, if desired, projections similar to projections 8 may be struck outwardly from the flange 4 of the frame for supporting the bumper.

The handle for the mower comprises a pair of converging arms 138 connected to each other at their outer ends to which a hand grip 140 is attached and within which an electrical switch may be enclosed.

The inner ends of the arms are each provided with a bearing member 142 having an opening of the same diameter as the ends of the rod 34 and is provided with a slot 144 of less width than the diameter of the bearing opening. The portions of the rod 34 engaged by the bearing members 142 are cut away to permit removal of the handle when raised from the normal position shown in full lines in Fig. 1 to a vertical position. Extending laterally from the handle adjacent to the hand grip 140 is a tube 146 through which the cord extending from a source of current supply extends to the switch, and which then extends from the switch to the motor 86.

The arms 138 between their ends are connected to each other by tie rods 148 and extending from one of the tie rods 148 is an L-shaped member 150, which together with the hand grip provides means on which the connecting cord can be coiled when the mower is not in use.

The foot of the L-shaped member is preferably positioned at such a distance from the axis of rod 34 that it will rest on the cap nut 80 on the top of the spindle 70 of the caster wheel when the handle is dropped.

When it is desired to adjust the blades for shortening or increasing the length of the cut, the thumb screw 84 is turned to lower or raise the clip 32 together with the forked ends of rods 42 and 28 to move the blades 104 closer to or raise them from the surface being mowed.

If it is desired to sharpen the blades, the blades are each shifted to align the openings 132 therethrough with their detents 128 on springs 130 secured to the springs 130 to prevent the blades from turning on their pivot screws 102, the mower is then positioned over a plane abrading surface, the blades are lowered into contact therewith, and, as the blades are backed by the flange of the spinner ring which is normal to the axis of the motor shaft, the entire peripheries of the blades will be equally sharpened by rotating the spinner ring by the motor as shown in Fig. 8.

In the form shown in detail in Figs. 10 and 11, the cutters are formed from flat sheet stock, dished to form cutting edges around the entire periphery of the blade which provides a cutter the entire rim of which engages a grinding surface during grinding and also provides cutter blades with rounded ends. However, the rounded ends are not essential, as a cheaper blade may be formed from rolled channel sections having a web portion with flaring flanges extending from both sides of the web at a suitable angle so that when the outer faces of the flanges are ground to the same plane so that the angle between the outer faces of the flanges and the end ground faces will be such as to form a cutting edge. In other words, the blades would be the same as those shown in Figs. 10 and 11 without rounded ends.

It will be evident that numerous variations in the invention may be made without departing from the principles thereof as defined in the following claims.

What I claim and desire to protect by Letters Patent is:

1. A lawn mower comprising a frame, a vertical shaft rotatably mounted in the frame, an annular blade support connected to the lower end of the shaft, a cutter blade pivotally mounted on the periphery of the bottom face of the blade support, a slot in the blade support adjacent the cutter blade, a coil spring having one end secured to the top of the blade support and the other end passing through the slot and secured to the cutter blade, the outer end of said slot being located so as to act as a stop on the action of the spring when the cutter blade is in cutting position at an angle to a radial line passing through the axis of the shaft and the pivot of the blade, and supporting wheels connected to the frame.

2. A lawn mower having a frame with a substantially closed top and a downwardly extending annular flange, a vertical shaft rotatably mounted in the frame, means to rotate the shaft, a cylindrical spinner ring having a hub and a horizontal annular flange at its periphery, said hub being connected to the lower end of the shaft, a plurality of cutter blades pivotally mounted on the bottom face of the spinner ring flange, spring means for normally maintaining each cutter blade in cutting position at an angle to a radial line passing through the axis of the shaft and the pivot of the blade, an annular guard extending from the flange of the frame to a position adjacent the periphery of the spinner ring forming an enclosed covering about the lower end of the shaft except for a narrow annular space between the spinner ring and the guard and supporting wheels connected to the frame.

3. A lawn mower comprising a frame, a vertical shaft rotatably mounted in the frame and an annular blade support connected to the lower end of the shaft, cutter blades pivotally mounted on the blade support, each of said cutter blades being dished to form flaring flanges extending downwardly through the body thereof, the lower faces of the flanges being in the same plane and forming cutting edges, spring means for normally maintaining each cutter blade in cutting position at an angle to a radial line passing through the axis of the shaft and the pivot of the blade, means for selectively adjusting the height of the blade which provide for lowering the blades into contact with the surface below them, and supporting wheels connected to the frame.

4. A lawn mover comprising a frame, a vertical shaft rotatably mounted in the frame, an annular blade support connected to the lower end of the shaft, cutter blades pivotally mounted on the blade support, each of said cutter blades being dished to form flaring flanges extending downwardly through the body thereof, the lower faces of the flanges being in the same plane and forming cutting edges, spring means for normally maintaining each of said cutter blades in cutting position at an angle to a radial line passing through the axis of the shaft and the pivot of the blade, stop means for limiting the angular position of the blade, a pair of arms pivotally mounted on the frame and extending forwardly of the frame, a supporting wheel mounted on the end of each arm, a rearwardly extending arm pivotally mounted on the frame, a caster pivotally mounted on the end of the rearwardly extending arm, a link pivotally connected to the frame and the caster, whereby the caster is connected to the frame by a pair of parallel levers, means for rocking the forwardly and rearwardly extending arms for raising and lowering the frame together with the cutters relative to the surface on which the wheels rest.

5. A lawn mower comprising a frame, a vertical shaft rotatably mounted in the frame, an annular blade support connected to the lower end of the shaft, cutter blades pivotally mounted on the blade support each of said cutter blades being dished to form flaring flanges extending downwardly through the body thereof, the lower faces of the flanges being in the same plane and forming cutting edges, spring means for normally maintaining each of said cutter blades in cutting position at an angle to a radial line passing through the axis of the shaft and the pivot of the blade, stop means for limiting the angular position of the blades, means for selectively holding each blade in a fixed position, means for selectively adjusting the blades into contact with the surface below them and supporting wheels connected to the frame.

6. A lawn mower comprising a frame, a vertical shaft rotatably mounted in the frame, an annular blade support connected to the lower end of the shaft, cutter blades pivotally mounted on the blade each of said cutter blades being dished to form flaring flanges extending downwardly through the body thereof, the lower faces of the flanges being in the same plane and forming cutting edges, spring means for normally maintaining each of said cutter blades in cutting position at an angle to a radial line passing through the axis of the shaft and the pivot of the blade, stop means for limiting the angular position of the blades, means for selectively holding each blade in a fixed position normal to a radial line from the center of the hub to the center of the blade, means for selectively adjusting the blades into contact with the surface below them, and supporting wheels connected to the frame.

ADOLPH W. GOLASKY.

REFERENCES CITED

The following references are of record in the file of this patent:

UNITED STATES PATENTS

| Number | Name | Date |
|---|---|---|
| 78,887 | Morse | June 16, 1868 |
| 864,812 | Thuillier | Sept. 3, 1907 |
| 1,868,918 | Schenk | July 26, 1932 |
| 2,167,222 | Shelor | July 25, 1939 |
| 2,263,431 | White | Nov. 18, 1941 |
| 2,281,639 | Swan | May 5, 1942 |
| 2,329,185 | Coddington | Sept. 14, 1943 |

FOREIGN PATENTS

| Number | Country | Date |
|---|---|---|
| 572,677 | Germany | Mar. 20, 1933 |